June 23, 1953     W. S. PEARSON     2,642,834
GALVANIZING APPARATUS
Filed May 11, 1948     2 Sheets-Sheet 1
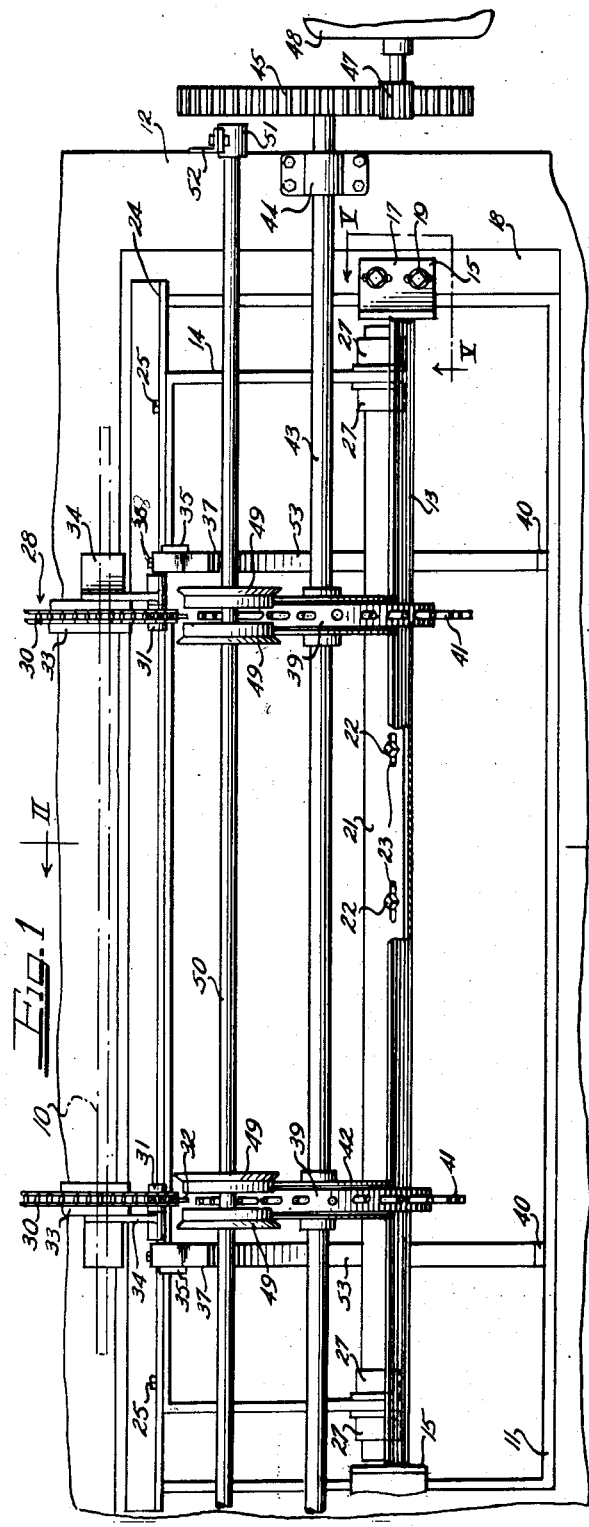
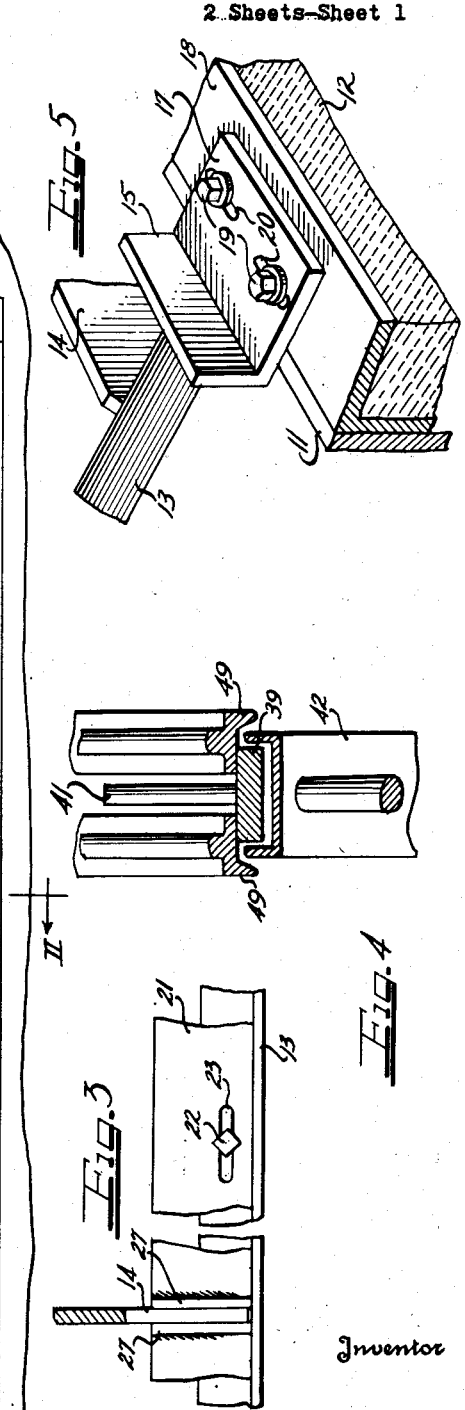
Inventor
William S. Pearson

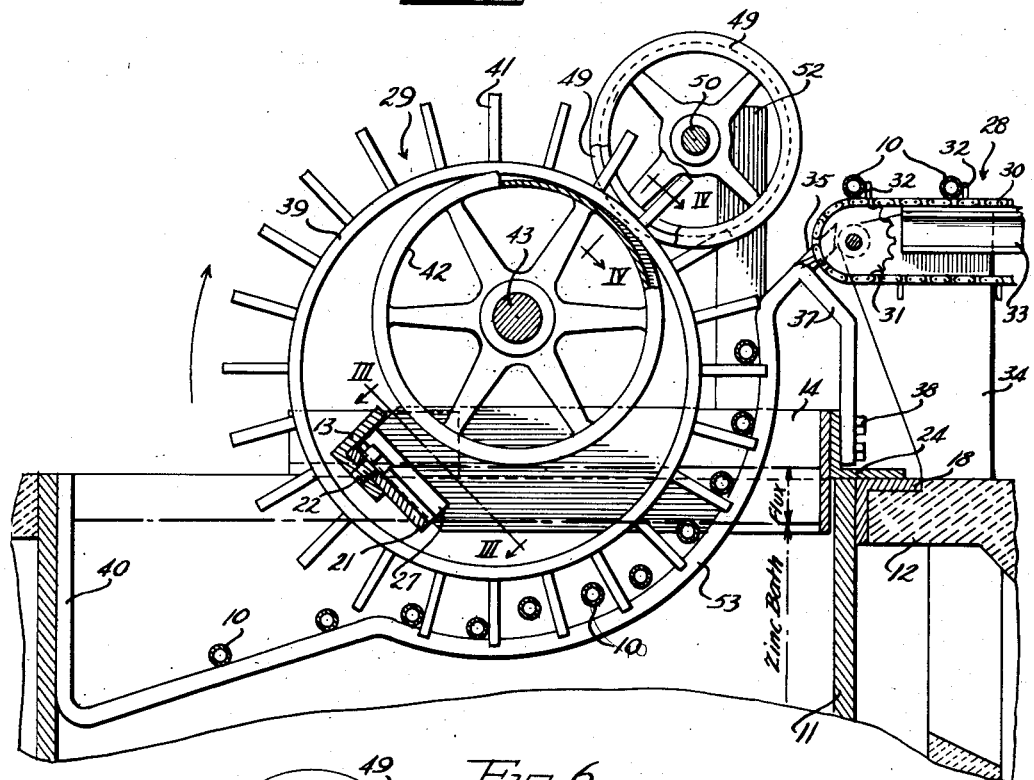
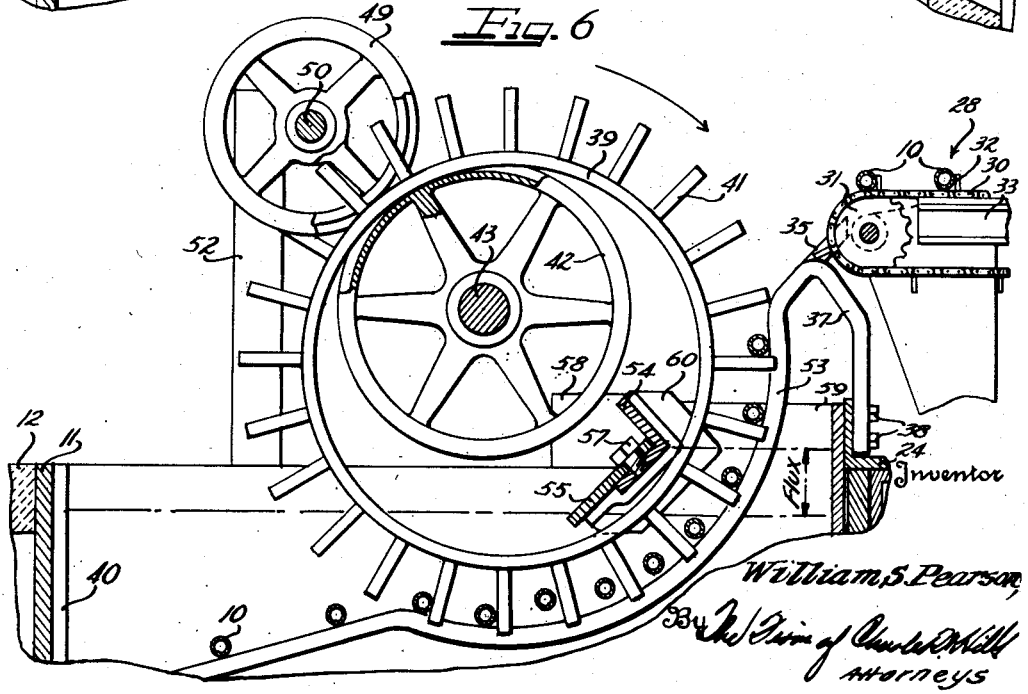

Patented June 23, 1953

2,642,834

UNITED STATES PATENT OFFICE 2,642,834

GALVANIZING APPARATUS

William S. Pearson, Baltimore, Md., assignor to Clifton Conduit Company, Inc., Baltimore, Md., a corporation of Maryland Application May 11, 1948, Serial No. 26,440

8 Claims. (Cl. 118—74)

The present invention relates to improvements in galvanizing apparatus and is more particularly concerned with a novel apparatus adapted for galvanizing a continuous succession of articles such as conduit pipe or the like.

In the galvanizing of elongated articles such as conduit pipe, it is desirable to limit the flux through which the articles must pass in intimate contact to a limited area above the zinc bath in which the articles are coated. To accomplish the galvanizing of the articles as a continuous process, they must be transported through the limited flux and then the zinc bath in spaced succession, and provision must be made for avoiding damage to the articles or to the mechanism in the event of jamming of the apparatus by any of the articles in the bath. It is also desirable to have the various components of the apparatus readily replaceable.

An important object of the present invention is to provide improved apparatus for galvanizing elongated articles such as conduit pipe as a continuous process, and wherein a flux bath is confined in a novel manner to a limited area of the surface of the zinc bath through which the articles are introduced into the zinc bath.

Another object of the invention is to provide an improved flux dam arrangement in a galvanizing machine.

A further object of the invention is to provide improved means for conveying elongated articles through a galvanizing bath.

Still another object of the invention is to provide in a galvanizing apparatus improved article impelling means.

Still another object of the invention is to provide in galvanizing apparatus improved rotary article impelling means which is arranged to avoid damage to the articles being galvanized in the event of jamming of any article in the course of operation of the apparatus.

Yet another object of the invention is to provide improved galvanizing apparatus for elongated articles such as conduit pipe or the like including an improved arrangement of article impelling mechanism and flux dam structure.

According to the general features of the present invention there is provided galvanizing apparatus for elongated articles such as conduit pipe and which includes a galvanizing bath, a flux dam for confining the flux to a limited area of the bath surface, and an impeller mechanism operative down through the flux and emerging from the galvanizing bath beyond the flux dam for moving a continuous spaced succession of the articles to be galvanized through the galvanizing bath.

According to other features of the invention the impeller comprises a ring member having peripheral radially projecting impeller pins, and means for supporting and driving the ring member with the flux dam traversing the interior of the ring.

A further important feature of the invention resides in the provision of a flux dam arrangement in galvanizing apparatus, including a removably mounted angular dam member across the surface of and extending slightly into the surface of the zinc bath and sufficiently thereabove to confine a flux pool upon the surface of the zinc to predetermined limits, and a flux frame cooperating with the dam member to further confine the flux pool to other limits upon the zinc bath.

Yet another feature of the invention resides in the provision of a ring type conveyor or impeller for galvanizing apparatus, and means for supporting and driving the ring member in a manner to permit relative slipping between the driving means and the ring for safety purposes in the event of abnormal resistance to operative movement of the ring member as might be caused by jamming of one or more of the articles being galvanized.

Other objects, features and advantages of the present invention will be readily apparent from the following detailed description of certain preferred embodiments thereof taken in conjunction with the accompanying drawings, in which:

Figure 1 is a fragmentary top plan view of a galvanizing apparatus embodying features of the invention;

Figure 2 is a vertical sectional view of the apparatus, on an enlarged scale taken substantially on the line II—II of Fig. 1;

Figure 3 is a fragmental sectional elevational view of a portion of the flux dam structure taken substantially on the line III—III of Fig. 2;

Fig. 4 is an enlarged, fragmentary sectional detail view taken substantially on the line IV—IV of Fig. 2;

Figure 5 is a sectional, fragmentary perspective view taken substantially on the angular section line V—V of Fig. 1; and Fig. 6 is a transverse vertical sectional view on the order of Fig. 2 but showing a slightly modified construction of the galvanizing apparatus.

The present invention is particularly concerned with apparatus for galvanizing elongated articles such as conduit pipe 10, as indicated in dot dash outline in Fig. 1 and in full outline in Figs. 2 and 6. In the galvanizing process, the lengths of conduit 10 are immersed in a molten zinc bath which is contained in a tank 11 open at the top and operatively surrounded by a furnace 12 of refractory or the like wherein an appropriate high temperature is maintained by means of gas burners or the like as is well known in the industry for maintaining the molten zinc at proper galvanizing temperature. Before the conduit sections 10 are actually immersed in the zinc bath, they must be thoroughly treated in a flux bath to assure subsequent uniform adherence of the zinc thereto.

In order to carry on the galvanizing process upon a continuous succession of articles, the flux is so located relative to the zinc bath that the articles can pass directly from the flux bath into the zinc bath. Inasmuch as the molten zinc is substantially heavier than the molten flux, it is possible to have the flux float on top of the zinc bath so that the articles can be conducted directly down through the flux into the zinc.

According to the present invention, the flux is confined to a relatively limited pool on the surface of the zinc bath and leaving a substantial surface area of the zinc bath therebeyond free for removal of the galvanized articles. To this end, a flux pool confining structure is associated with one side of the tank 11 and comprises a flux dam 13 and a cooperating retaining frame 14. The dam 13 extends across the tank 11 so as to confine the flux pool to but a portion of the zinc bath surface while the remainder of the zinc bath surface is left entirely open for removal of the galvanized articles therefrom.

For this purpose the dam 13 comprises an angle iron member fixedly secured as by welding at its ends to respective angular supporting brackets 15 having horizontal bearing flanges 17 secured to an upper marginal bordering frame structure 18 about the top of the tank 11 as by means of screws 19 extending through spaced, aligned respective slots 20 in the bearing flange. Through this arrangement the dam 13 can be readily installed or removed as desired.

The dam bar 15 itself is preferably located to span the tank 11 at an elevation higher than the normal level of the zinc bath, and a dam plate 21 is secured to the lower flange of the bar 13 as by means of screws 22 extending through longitudinally aligned, spaced respective slots 23 in the plate 21, the lower edge of the plate extending down below the surface of the zinc bath and thus cooperating with the dam bar 13 to confine the flux to one side of the surface of the zinc bath.

The flux retaining frame 14 is constructed and arranged to confine the pool of flux to smaller limits adjacent the ends of the tank 11 and for this purpose preferably comprises a substantially U-shaped metal plate structure of ample width to extend into the zinc bath approximately the same distance as the dam plate 21 and with its upper edge approximately in a plane with the upper edge of the bar 13. The confining frame 14 defines a space longitudinally of the tank 11 which is somewhat longer than the conduit sections 10 but yet confining the flux pool to an economical spread. The ends of the arm portions of the frame 14 are supported by the dam 13 while the base or web portion of the frame 14 is secured to an upstanding flange of an angular supporting bracket bar 24 on top of the proximate side of the tank 11. A separable attachment of the frame 14 to the bracket 24 may be effected by means of screws 25.

At their free ends the arms of the frame 14 are supported by the dam 13. To this end, the angular main bar of the dam 13 is mounted with the divergent flange portions thereof providing an angular reentrant channel or groove in which the end portions of the frame arms are received and supported. Through this arrangement the dam plate 21 diagonally underlies the end portions of the frame legs in supporting relation. The tips of the frame legs or arms are preferably shaped complementary to the engaged opposing surfaces of the dam structure, substantially as shown in Fig. 2, and may be provided with angular bearing flanges 27 which rest flat against the plate 21 and may, if desired, be detachably secured thereto. Through this arrangement it will be clear that the flux bath is confined to a pool of predetermined area occupying but a portion of the surface area of the zinc bath adjacent to one side of the tank 11.

Means are provided for introducing the sections of conduit 10 in continuous spaced succession through the flux pool into the zinc bath and guiding and impelling the conduit sections through the zinc bath as they are being galvanized to a place where the galvanized conduit sections can be removed from the galvanizing bath in an area left free by confinement of the flux pool to a limited portion of the zinc bath surface. Herein such means comprises a delivery conveyor 28 which delivers a continuous succession of the conduit sections 10 to a guiding and impeller mechanism 29. The conveyor 28 comprises a pair of spaced parallel endless chains 30 which adjacent to the galvanizing tank 11 are trained over respective sprockets 31. Lugs 32 projecting from the conveyor chains 30 at spaced intervals compel the conduit sections 10 to travel with the chains in parallel relation to the tank 11. Longitudinally underlying supporting bars 33 hold the supporting runs of the chains 30 against sagging.

The delivery end of the conveyor 28 is preferably supported at a substantial elevation above the adjacent side of the galvanizing tank 11 by means of supporting frame structure 34. As each successive one of the conduit pieces 10 to be galvanized drops off of the end of the conveyor 28, it falls on identical ramp extensions 35 of a pair of similar guide members 37 which are preferably in the form of appropriately configurated metal bars having the end portions thereof contiguous the conveyor 28 secured as by means of screws 38 to the upstanding flange of the bracket bar 24.

The guide bars 37 dip down from the ramp extensions 35 thereof into and through the flux pool into the zinc bath and are in engagement at their opposite end portions with the inside face of the opposite wall of the galvanizing tank 11. Intermediately the guide bars 37 are formed to cooperate with an impelling ring member 39 while adjacent to the take-out side of the galvanizing tank the bars dip down obliquely toward the wall of the tank to guide the galvanized conduit sections toward such wall, while the end portions of the guide bars engaging the wall extend upwardly therealong to provide spacers 40 which will hold the galvanized conduit sections away from the wall thus facilitate engagement and removal of the galvanized sections by means of take-out hooks or tongs.

The construction and relationship of the guide bars 37 and the impeller rings 29 is such that the successive conduit sections 10 are maintained in substantial parallelism and they are fed through the galvanizing bath. To this end, the cooperating guide bars and impelling rings are disposed in spaced relation to engage the conduit sections adjacent to their opposite ends and the impeller rings are adapted to be driven in unison.

Each of the impeller rings 39 comprises a metallic ring of flattened bar stock carrying a uniformly spaced series of radially outwardly projecting impeller pins 41. The diameter of the ring 39 is such that it can be disposed to encircle the dam 13 and a supporting and drive pulley 42 and dip down through the flux pool into the zinc bath. The supporting and drive pulleys 42 for the impeller rings are fixed upon a drive shaft 43 which is carried by journals 44 at the opposite ends of the furnace 12 and has at one end a gear 45 which meshes with a drive pinion 47 which is motivated in appropriate manner such as by the drive shaft of a motor 48.

As best seen in Figs. 2 and 4, the pulley 42 in each instance has a shallow channel-shaped periphery within which the impeller ring 39 is carried. There is thus afforded a frictional drive for the impeller ring. Should movement of the impeller ring be impeded for any reason such as by jamming of one or more of the conduit sections being galvanized, the drive pulleys 42 can slip relative to the ring and thus avoid damaging the conduit sections in engagement with the impeller wheel or ring. This frictional support and drive of the ring also facilitates realignment of the two impeller rings with respect to the impeller pins 41 thereof.

In order to limit the diameter of the impeller rings 39 and yet afford ample clearance between the inner peripheries of the impeller rings and the supporting and drive pulleys 42 to accommodate the dam 13 traversing the interiors of the impeller rings, means are provided for maintaining the rings in lateral eccentricity to the pulleys 42. Herein such means comprise respective pairs of flanged wheels 49 which engage the outer peripheries of the respective impeller rings 39 at respective opposite sides of and clear of the impeller pins 41 at an appropriate point offset from a vertical plane through the axis of the pulleys 42 and coacting with the respective impeller rings to hold them in traction with the drive pulleys against any tendency for the rings to float up therefrom under influence of the zinc bath or other reasons.

The wheels 49 are idlers supported by an idler shaft 50 carried by appropriate journals 51 at its ends and mounted on supporting frame members 52 at the ends of the furnace. As best seen in Fig. 2 the spacing between the idler wheels 49 and the pulley 42 in each instance is slightly greater than the thickness of the impeller ring 39 so that there will be no active gripping action of the idlers 49 to prevent the slipping of the drive pulleys in the event of an emergency as discussed hereinabove.

In operation the conveyor 28 and the impeller rings 39 are driven in coordination so that as each of the conduit sections 10 drops from the conveyor 28 corresponding ones of the impeller pins 41 of the impeller rings 39 afford, in substance, a handling pocket open to receive the conduit section. As the impeller rings 39 rotate onward to carry the newly received conduit section 10 toward the flux bath, the supporting impeller pins 41 leave the cooperative receiving relation to the ramps 35 of the guide bars 37, and the intermediate portion of the guide bars 37 formed to provide an arcuate section 53 on a radius parallel to the adjacent periphery of the associated impeller ring 39 cooperate with the tips of the impeller pins 41 to confine the conduit sections within their respective pin formed pockets. The spacing between pins is ample to permit limited movement of the conduit sections therebetween such as may be desirable for release of air from the interiors thereof as they are immersed first in the flux and then in the zinc bath, but the spacing is small enough to avoid such tilting or cocking of any conduit section as would tend to permit the same to slip endwise from the guide bars 37. In the initial immersion of the conduit sections in the flux bath, the end arms of the flux pool confining frame 14, of course, also are available to prevent undue endwise movement of any conduit section.

Since at least in the initial stages of immersion of the conduit sections 10 in the zinc bath, there may be a tendency for the conduit section to float, it will be apparent that the impeller rings 39 will act to keep the conduit sections immersed in the zinc bath while the sections are advanced by the impeller on through the molten bath in the hottest upper zone thereof and until there is no longer tendency of the conduit sections to float, as the galvanizing thereof proceeds and the molten zinc fills the conduit sections.

As each of the impeller pins 41 leaves the arcuate section of the guide bars 37 on the upsweep of the ring 39 the galvanized conduit section impelled thereby is released to roll down the take-out end portion of the guide bar 37 toward the spacer sections 40.

In the form of the invention shown in Figs. 1 and 2, it will be observed that the flux dam 13 is disposed adjacent to the side of the impeller rings 39 remote from the arcuate guide portions 53 of the guide bars 37. In such arrangement the eccentricity idler wheels 49 are disposed adjacent to the conveyor 28. In this arrangement the drive pulleys 42 for the impeller mechanism may, at least when the flux pool is fairly deep, dip into the flux.

In the modification shown in Fig. 6, all of the mechanism with the exception of the flux dam structure is substantially identical with the form of Figs. 1 and 2, and similar reference numerals identify identical parts. In this modified form of Fig. 6, the eccentricity idlers 49 are mounted at the opposite side of the respective impeller rings 39 and the supporting and drive pulleys 42 are mounted on axes slightly further removed from the conveyor 28 but at the same elevation as in Fig. 2, the arrangement being such that eccentricity of the impeller ring 39 relative to the drive pulleys 42 inclines toward the conveyor 28 and affords maximum spacing between the pulleys 42 and the interiors of the rings 39 adjacent to the arcuate guide portion 53 of the respective guide bars 37. Hence a flux dam 54 can be located much closer to the entry side of the galvanizing tank to provide a much narrower flux pool and permit the supporting and drive pulleys 42 to operate clear of the flux bath.

In the modification the dam 54 comprises an angular bar similarly as described in connection with the dam 13, but the bar is turned around the other way so that instead of the peak of the angle being directed away from the guide bars 37, it is directed toward the same and a lower extension plate 55 secured to the lower flange of the dam bar 54 as by means of screws 57 angles outwardly relative to the flux pool. This arrangement, similarly as the arrangement of the dam 13 and the extension plate 21 thereof efficiently clears the inner circumference of the impeller rings 39 as well as the circumference of the pulleys 42. End brackets 58 support the dam 54, and a U-shaped flux confining frame 59 has angularly shaped brackets 60 at the ends of the arms thereof which engage the dam 54 and are supported thereby, the web or base of the frame being secured to the side angle bracket 24 in similar fashion as the previously described flux confining frame 14.

Operation of the modified form of Fig. 6 is the same as that described for the form of Figs. 1 and 2, and need therefore not be repeated.

In both forms of the invention the flux dam can be readily mounted or removed as required, the main dam bar is readily adjustable into cooperation with the flux confining frame. The impeller wheels or rings are adapted to be readily assembled and the particular mounting and driving thereof simplifies the dam structure and greatly facilitates assembly thereof with the flux dam bar extending through the impeller rings. All of the several components of the apparatus are of relatively simple and rugged construction and the entire assembly is of especially compact and efficient arrangement.

I claim as my invention:

1. In combination in galvanizing apparatus, an impeller ring comprising a simple rim having a series of radial impeller pins thereon, a grooved pulley supporting and driving said impeller ring, means cooperating with said impeller ring to maintain the ring in driving engagement with the pulley, and guide means cooperative with the pins on said impeller ring for guiding articles to be galvanized as they are impelled through a galvanizing bath by said pins in the rotation of the ring by said pulley.

2. In combination in galvanizing apparatus of the character described, means for supporting a galvanizing bath, an impeller ring, a supporting and drive pulley of smaller diameter supporting said impeller ring in position to dip partially into the galvanizing bath, means cooperatively related to the impeller ring to support articles to be galvanized in position to be moved through the bath by the impeller ring, an idler wheel structure engaging the impeller ring and maintaining the same in offset eccentricity relative to a vertical plane through the axis of the pulley, and a flux dam structure extending through the impeller ring between the inner periphery thereof and said pulley in the eccentric space afforded between the ring and the pulley by the action of said idler.

3. In combination in galvanizing apparatus of the character described, means for supporting a galvanizing bath, an impeller ring, a supporting and drive pulley of smaller diameter supporting said impeller ring in position to dip partially into the galvanizing bath, means cooperatively related to the impeller ring to support articles to be galvanized in position to be moved through the bath by the impeller ring, an idler wheel structure engaging the impeller ring and maintaining the same in offset eccentricity relative to a vertical plane through the axis of the pulley, and a flux dam structure extending through the impeller ring between the inner periphery thereof and said pulley in the eccentric space afforded between the ring and the pulley by the action of said idler, the idler wheel structure being spaced from the pulley further than the thickness of the impeller ring whereby to avoid restraint by the idler upon emergency slipping of the pulley relative to the impeller ring.

4. In combination in a galvanizing apparatus of the character described, a galvanizing tank, a conduit feed conveyor, a pair of guide bars cooperatively related to the conveyor to receive successive sections of conduit to be galvanized therefrom and extending into the galvanizing tank, a spaced pair of impeller rings, respective drive pulleys of smaller diameter supporting said rings, said rings having radial pins cooperatively related to coact with said guide bars to engage and impel the successive conduit sections through a portion of the galvanizing tank, means cooperating with the impeller rings to maintain the same on axes disposed in offset eccentricity relative to a vertical plane through the axis of the pulleys, a flux dam bar extending through the impeller rings in the eccentric spacing between the rings and the pulleys and supported at the opposite ends of the tank, said bar having a dam plate extending diagonally in clearing relation in said eccentric space, and a flux confining frame supported at the side of the tank behind said guide bars and by said dam bar adjacent to the opposite ends of the tank and between said opposite ends of the tank and said impeller rings.

5. In combination in apparatus for galvanizing conduit sections, a galvanizing tank adapted to contain a body of galvanizing material to an approximate level therein, an impeller ring having a series of radially projecting impeller pins on its outer periphery, a drive pulley of smaller diameter than the impeller ring supporting the impeller ring by riding of the inner periphery of the impeller ring on the pulley, means cooperating with said impeller ring to maintain the ring in driving engagement with the pulley, said drive pulley being disposed entirely above the galvanizing material level, but at such an elevation as to support the impeller ring with the lower portion of the impeller ring dipping below said level, guide means for the conduit sections cooperative with the lower portion of the impeller ring in the tank, said pins being adapted to impel a succession of conduit sections along said guide means downwardly through said galvanizing material.

6. In combination in apparatus for galvanizing conduit sections, a galvanizing tank adapted to contain a body of galvanizing material to an approximate level therein, an impeller ring having a series of radially projecting impeller pins on its outer periphery, a drive pulley of smaller diameter than the impeller ring supporting the impeller ring by riding of the inner periphery of the impeller ring on the pulley, said drive pulley being disposed entirely above the galvanizing material level, but at such an elevation as to support the impeller ring with the lower portion of the impeller ring dipping below said level, guide means for the conduit sections cooperative with the lower portion of the impeller ring in the tank, said pins being adapted to impel a succession of conduit sections along said guide means downwardly through said galvanizing material, and an idler wheel engaging the outer periphery of the impeller ring and maintaining the impeller ring in offset eccentricity relative to a vertical plane through the axis of the drive pulley.

7. In combination in apparatus for galvanizing conduit sections, a galvanizing tank adapted to contain a body of galvanizing material to an approximate level therein, an impeller ring having a series of radially projecting impeller pins on its outer periphery, a drive pulley of smaller diameter than the impeller ring supporting the impeller ring by riding of the inner periphery of the impeller ring on the pulley, said drive pulley being disposed entirely above the galvanizing material level, but at such an elevation as to support the impeller ring with the lower portion of the impeller ring dipping below said level, guide means for the conduit sections cooperative with the lower portion of the impeller ring in the tank, said pins being adapted to impel a succession of conduit sections along said guide means downwardly through said galvanizing material, and an idler wheel engaging the outer periphery of the impeller ring and maintaining the impeller ring in offset eccentricity relative to a vertical plane through the axis of the drive pulley, said idler wheel comprising two spaced apart annular portions engaging the outer periphery of the impeller ring at respective opposite sides of said impeller pins and with a space between said annular portions to clear the impeller pins in the rolling of the idler wheel on the impeller ring.

8. In galvanizing apparatus, an impeller ring of substantial diameter having a series of radially outwardly projecting impeller elements, means for supporting articles to be galvanized in position to be impelled by said projecting elements, a driving wheel in simple relatively slidable frictional driving engagement with the inner periphery of said impeller ring, and thrust means normally acting on the outer periphery of the impeller ring to urge the same into driving frictional engagement with said driving wheel in a manner to permit relative slipping between the driving wheel and the inner periphery of the ring for safety purposes in the event of abnormal resistance to operative movement of the ring as might be caused by jamming of an article impelled along said supporting means by one of said elements.

WILLIAM S. PEARSON.

References Cited in the file of this patent

UNITED STATES PATENTS

| Number | Name | Date |
|---|---|---|
| 663,034 | Lynch | Dec. 4, 1900 |
| 1,012,047 | Armstrong | Dec. 19, 1911 |
| 1,012,048 | Armstrong | Dec. 19, 1911 |
| 1,330,399 | Shoemaker | Feb. 10, 1920 |
| 1,706,348 | Buchert | Mar. 19, 1929 |
| 2,493,769 | Magnin | Jan. 10, 1950 |